US012224938B2

(12) United States Patent
Sharma

(10) Patent No.: US 12,224,938 B2
(45) Date of Patent: Feb. 11, 2025

(54) SYSTEMS AND METHODS FOR MANAGING A NETWORK

(71) Applicant: Comcast Cable Communications, LLC, Philadelphia, PA (US)

(72) Inventor: Alankar Sharma, Mt. Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 513 days.

(21) Appl. No.: 13/943,177

(22) Filed: Jul. 16, 2013

(65) Prior Publication Data

US 2015/0023173 A1   Jan. 22, 2015

(51) Int. Cl.
*H04L 47/122* (2022.01)
*H04L 45/00* (2022.01)

(52) U.S. Cl.
CPC ............ *H04L 47/122* (2013.01); *H04L 45/22* (2013.01)

(58) Field of Classification Search
CPC .............................. H04L 47/122; H04L 45/22
See application file for complete search history.

(56) References Cited

U.S. PATENT DOCUMENTS

| | | | |
|---|---|---|---|
| 7,054,557 B1 * | 5/2006 | Dasylva | H04J 14/0227 370/248 |
| 8,081,566 B1 * | 12/2011 | Ashwood-Smith | H04L 47/122 370/237 |
| 8,693,374 B1 * | 4/2014 | Murphy | H04L 12/28 370/255 |
| 8,958,286 B1 * | 2/2015 | Atlas et al. | 370/225 |
| 2005/0259586 A1 * | 11/2005 | Hafid | H04L 45/24 370/228 |
| 2006/0203719 A1 * | 9/2006 | Kim et al. | 370/227 |
| 2007/0118636 A1 * | 5/2007 | Yang | H04L 45/00 709/223 |
| 2008/0080473 A1 * | 4/2008 | Thubert | G06F 13/4045 370/348 |
| 2008/0159288 A1 * | 7/2008 | Nagarajan | H04L 45/38 370/392 |
| 2008/0205265 A1 * | 8/2008 | Del Regno | H04L 45/00 370/221 |
| 2009/0304007 A1 * | 12/2009 | Tanaka | H04L 45/66 370/395.53 |
| 2011/0141891 A1 * | 6/2011 | So | H04L 45/507 370/235 |

(Continued)

OTHER PUBLICATIONS

U.S. Appl. No. 61/841,726, "Locally Protecting Service in LSP", Jul. 1, 2013.*

(Continued)

*Primary Examiner* — Thinh D Tran
(74) *Attorney, Agent, or Firm* — Ballard Spahr LLP

(57) ABSTRACT

Systems and methods for managing a network are disclosed. One method can comprise receiving data having information identifying a first path to a destination, wherein the information facilitates transmission of the data to a next-hop of the first path. A congestion state of the first path can be determined. If the first path has a congested state, a second path to the destination can be determined, wherein the second path has a non-congested state. The information of the data can be updated to identify the second path to the destination, wherein the updated information facilitates transmission of the data to a next-hop of the second path.

21 Claims, 10 Drawing Sheets

(56) References Cited

U.S. PATENT DOCUMENTS

| | | | |
|---|---|---|---|
| 2011/0261696 A1* | 10/2011 | Crisan et al. | 370/235 |
| 2011/0296052 A1* | 12/2011 | Guo | G06F 9/5077 |
| | | | 709/240 |
| 2013/0336116 A1* | 12/2013 | Vasseur | H04L 45/22 |
| | | | 370/235 |
| 2014/0254353 A1* | 9/2014 | Ye | H04L 45/28 |
| | | | 370/228 |
| 2015/0003231 A1* | 1/2015 | Chen | H04L 45/22 |
| | | | 370/221 |
| 2015/0372902 A1* | 12/2015 | Giorgetti | H04L 45/64 |
| | | | 370/219 |

OTHER PUBLICATIONS

Chen, "Locally Protecting Service in LSP", U.S. Appl. No. 61/841,726, filed Jul. 1, 2013 (Year: 2013).*

* cited by examiner

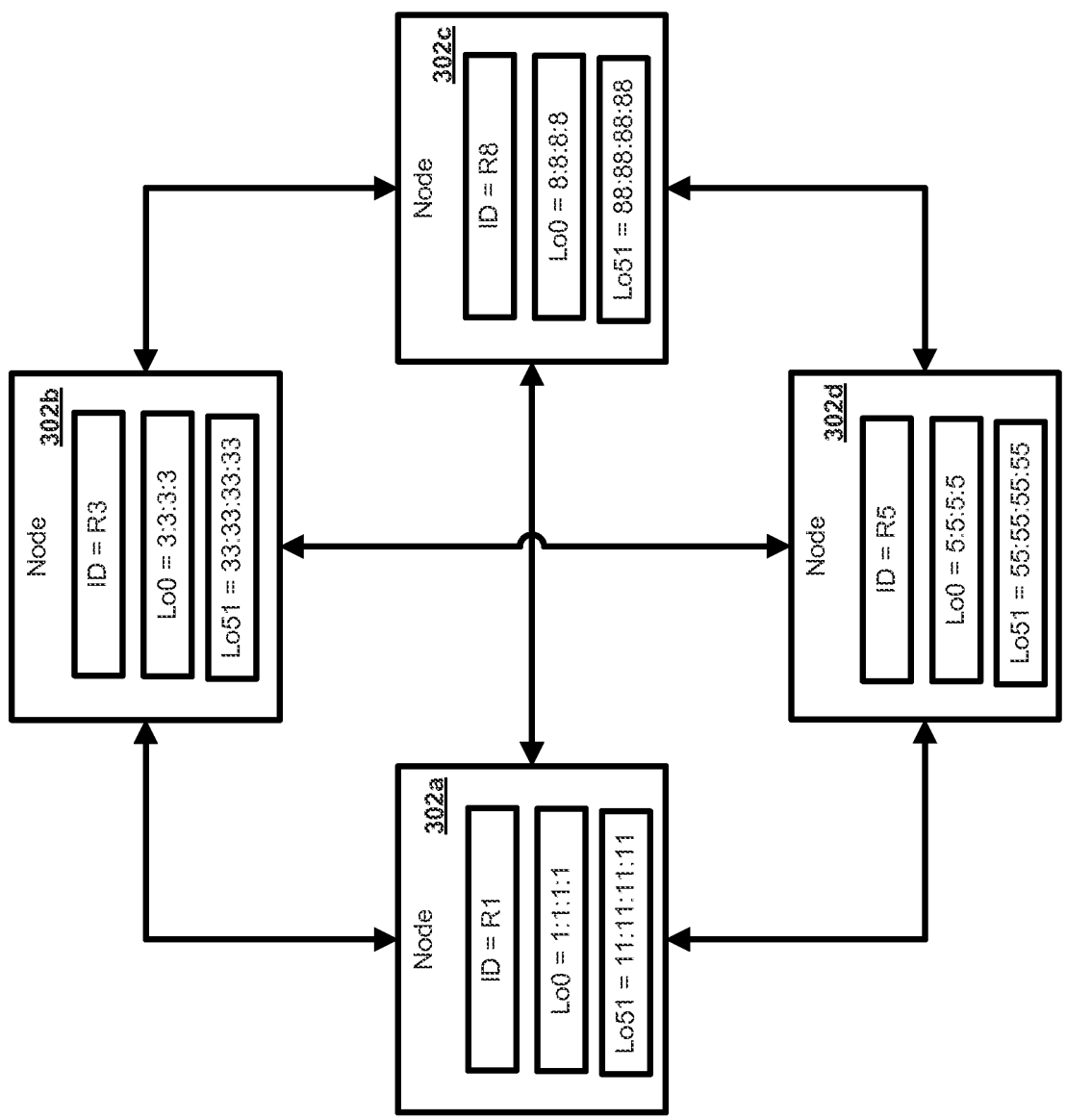

SYSTEMS AND METHODS FOR MANAGING A NETWORK

BACKGROUND

Networks can experience problems due to network constraints such as congestion. One existing solution is to add more network links, which may be expensive and take months or years, or may not be possible. Until new network links are added, network-reliant service providers can lose customers and revenue. This disclosure addresses such and other shortcomings related to network management.

SUMMARY

It is to be understood that both the following general description and the following detailed description are exemplary and explanatory only and are not restrictive, as claimed. Methods and systems for managing a network are disclosed. The methods and systems described herein, in one aspect, can manage congestion in a packet network. In another aspect, methods and systems address the issue of data loss or packet drops over congested links in large networks by providing a network congestion algorithm and a protocol. Such an algorithm and protocol can implemented to facilitate elastic bandwidth (e.g., via elastic routing (ER)). Elastic bandwidth can comprise additional bandwidth made available via an alternate path when a primary path is unavailable (e.g., filled to capacity, failed, etc.).

In an aspect, methods can comprise receiving information identifying a first path to a destination, wherein the information facilitates transmission of the data to a next-hop of the first path. The methods can further comprise determining a congestion state of the first path. If the first path has a congested state, a second path to the destination is determined, wherein the second path has a non-congested state. The information can be updated to identify the second path to the destination, wherein the updated information facilitates transmission of the data to a next-hop of the second path.

In an aspect, methods can comprise receiving first data at a first node, the first data comprising a first identifier associated with the first node and a second identifier associated with a first path. The first identifier can be removed from the first data. A congested state of the first path can be determined using the second identifier. A second path can be determined to have a non-congested state, wherein the second path is associated with a third identifier. The first data can be updated to comprise the third identifier. The updated first data can be transmitted to a second node, wherein the second path comprises the second node.

In another aspect, the methods can comprise determining a topology of at least a portion of a network and determining a first path of a node pair of the network based on the determined topology. A congested state associated with an interface of the first path can be detected and a second path can be provided as an alternate for the first path, wherein the second path circumvents the interface with the detected congested state.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4B is a diagram of an exemplary system and network;

DETAILED DESCRIPTION

Figure 1A:
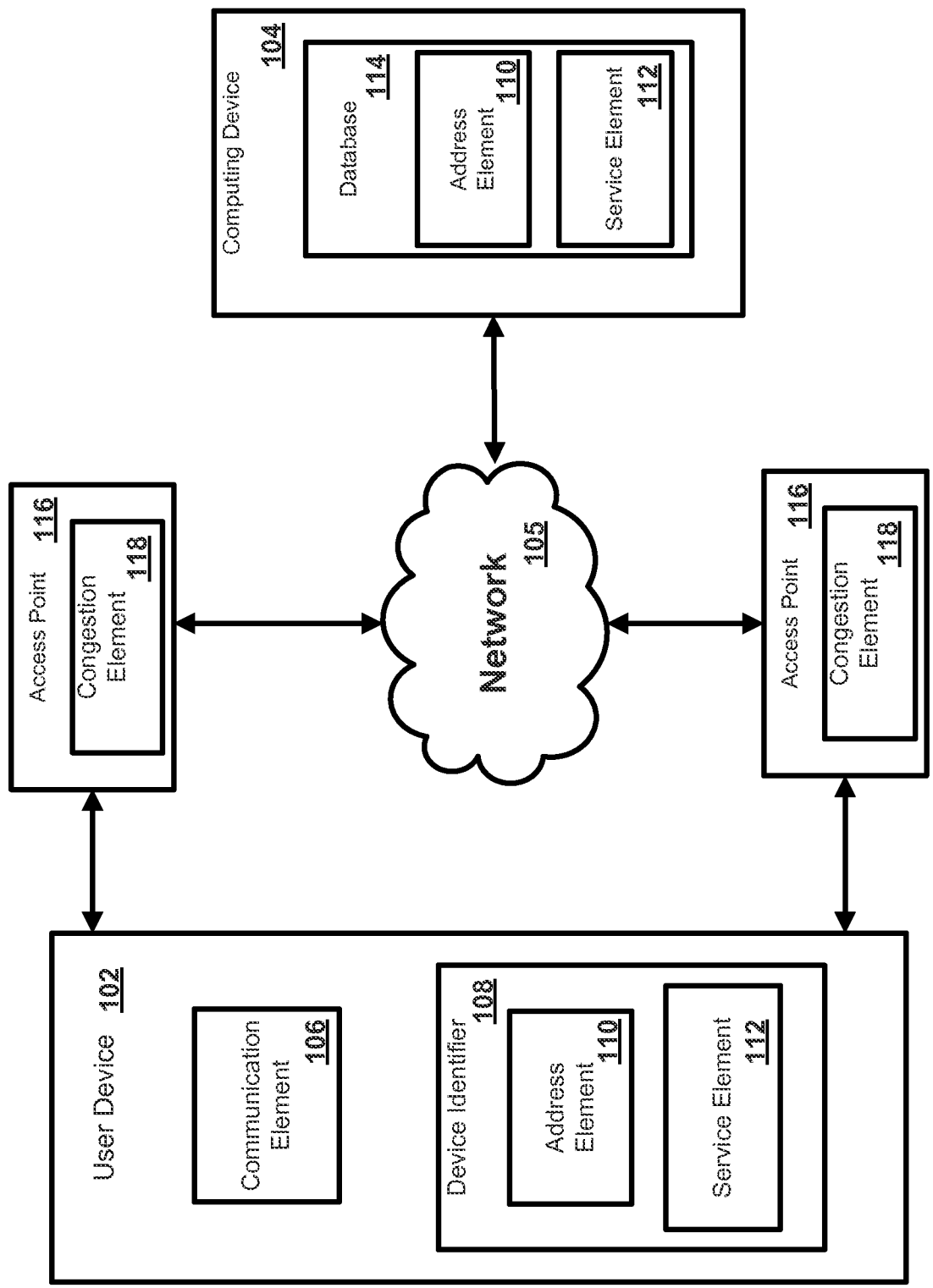
FIG. 1A is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for managing a network are disclosed. The methods and systems described herein, in one aspect, can manage congestion in a packet network. In another aspect, methods and systems address the issue of data loss or packet drops over congested links in large networks by providing a network congestion algorithm and a protocol as its implementation to facilitate elastic bandwidth.

Bandwidth intensive network traffic such as video can cause peaks and spikes in network bandwidth usage, sometimes leading to data loss or packet drops and hence degrading a user experience. The methods and systems described herein, in one aspect, manage network congestion by allocating available bandwidth from neighboring nodes to generate additional ad hoc bandwidth. A feedback mechanism can be provided to guide traffic to an alternative network path in order to circumvent a congested path. Such alternative paths can be facilitated by leveraging one or more loopback interfaces associated with one or more nodes.

FIG. 1A illustrates various aspects of an exemplary network in which the present methods and systems can operate. The present disclosure is relevant to systems and methods for managing a network, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

The systems can comprise a user device 102 in communication with a computing device 104, such as a server or Network Interface Device (NID), for example. The computing device 104 can be disposed locally or remotely, relative to the user device 102. As an example, the user device 102 and the computing device 104 can be in communication via a private and/or public network 105, such as the Internet. Other forms of communications can be used, such as wired and wireless telecommunication channels, for example.

In an aspect, the user device 102 can be an electronic device, such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback, such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102.

In an aspect, the service element 112 can comprise an identification of a service provider associated with the user device 102 and/or with the class of user device 102. As an example, the service element 112 can comprise information relating to, or provided by, a communication service provider that is providing or enabling communication services to the user device 102. Services can be data services, such as internet access, financial data transfers, or various file transfer, voice, and/or video services, or a combination thereof. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources, such as data, devices, and files. As an example, the computing device can be configured as a central location, a headend, or a processing facility, which can receive content (e.g., data, input programming) from multiple sources. The computing device 104 can combine the content from the various sources and can distribute the content to user locations via a distribution system.

In an aspect, the computing device 104 can manage the communication between the user device 102 and a database 114 for sending and receiving data therebetween. As an example, the database 114 can store a plurality of files, webpages, user identifiers or records, or other information. As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more access points 116 can be in communication with network 105. One or more access points 116 can be a node, router, switch, domain boundary, network interface, or other communication device. As an example, one or more of the access points 116 can facilitate the connection of a device, such as user device 102, to the network 105. As a further example, one or more of the access points 116 can be configured as a virtual local area network (VLAN) access point. In an aspect, one or more access points 116 can be configured as part of a Carrier Ethernet Network.

In an aspect, one or more of the access points 116 can comprise a congestion element 118. The congestion element 118 can be or comprise a congestion control element. The congestion element 118 can comprise hardware and/or software. As an example, the congestion element 118 can be configured to receive/transmit data in packets and/or Ethernet frames. As a further example, the congestion element 118 can be configured to analyze some, a portion of, or all of the frames and/or packets to determine congestion information or transmit frames and/or packets comprising a congestion indicator, such as delay information. In an aspect, the congestion element 118 can comprise a traffic conditioning element configured to analyze and condition data packets. The congestion element 118 can comprise hardware, software, or a combination thereof. The congestion element 118 can be configured to implement a congestion algorithm.

Figure 1B:
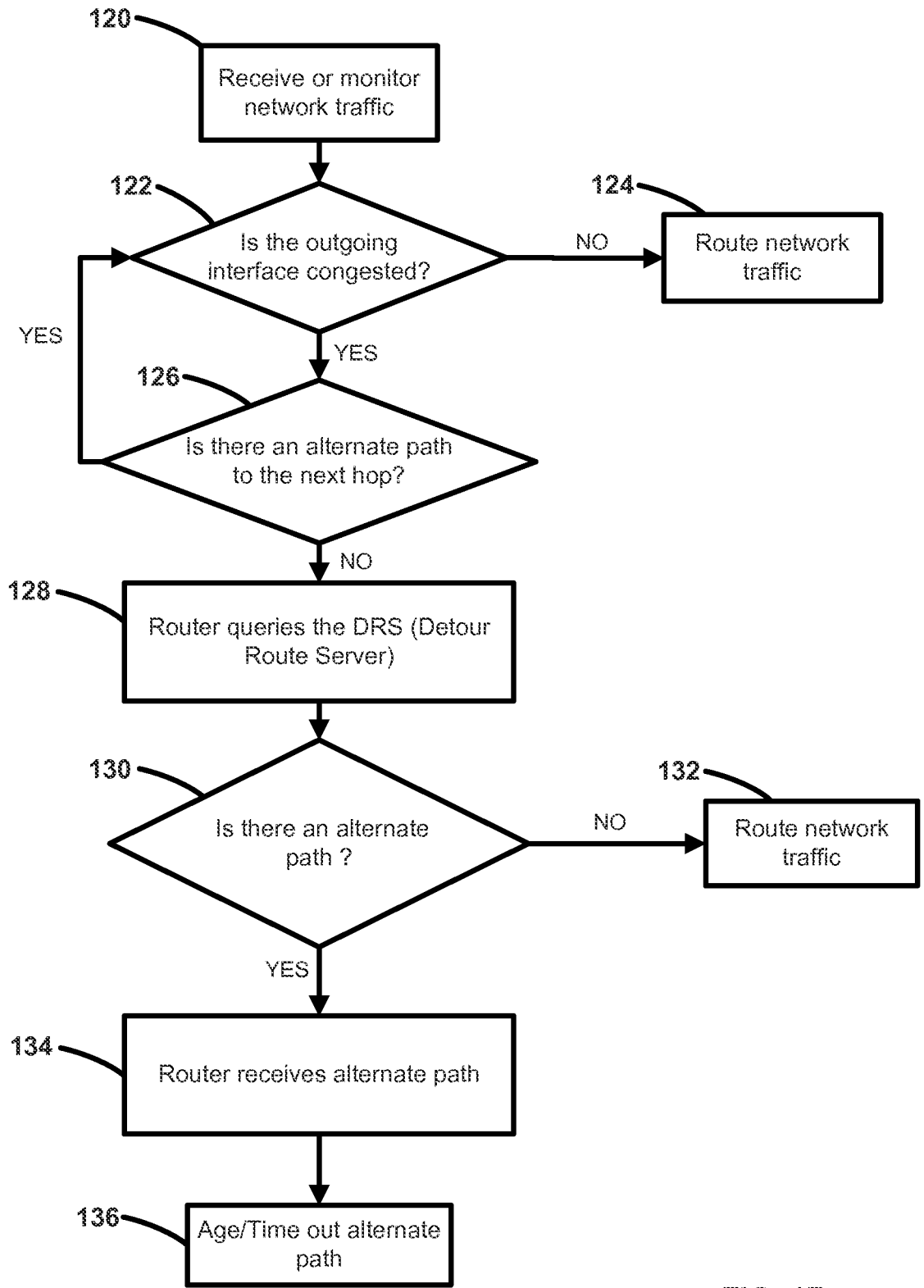
FIG. 1B is a flow chart of an exemplary method.

FIG. 1B illustrates a method for congestion management in a network. In an aspect, the method can be implemented via an IP network, such as a mesh network identified by an ASN (e.g., running IGP (OSPF or IS-IS, for example) and border gateway (BGP) within the ASN and externally.)

At step 120, network traffic (e.g., flow (F1)) can be received at a first node (e.g., router, network device, etc.). Alternatively, network traffic can be remotely monitored. In an aspect, a congestion threshold is defined on a per interface basis or globally in the QoS settings on a node. The congestion threshold can be a variable that can be set to any value in percentage or absolute value as a part of the total bandwidth of a link.

At step 122, the first node can determine if an interface (e.g., loopback interface, link) in an outgoing path is congested. In an aspect, a path can be a hop-by-hop set of nodes visited in travelling from one point to another in the network. In another aspect, a hop in a path may comprise several links configured to pass the network traffic. As an example, node-x and node-y may have 6 of 10 Gigabit Ethernet (GE) links or other links between them, load sharing the traffic from point x to point y.

If it is determined that the interface is not congested, the network flow can be routed based on current (e.g., normal, default, predefined, etc.) settings, at step 124. At step 126, if the link is determined to be congested, it can be determined whether an alternative path to the next hop (e.g., external border gateway protocol (EBGP) exit point, end point, destination node, next node in path, etc.) is available and known. In an aspect, the node can analyze a local cache, such as a data structure such as a table (e.g., routing table), to determine if an alternative path (e.g., transmission route) is available.

At step 128, the first node can query a detour route element (e.g., server) for an alternate path, indicating that its current path to the given next-hop in the routing table is congested. In an aspect, the detour route element can be configured as an enhanced network weather map. A weather map can be an application that can generate a network topology map and can identify utilization on each link and/or path hop. In another aspect, the detour route element can be synced with the link-state database (LSDB) of the interior gateway protocol (IGP). Based on topology information, the detour route element can calculate one or more possible paths from one point to another in the network. As an example, for a given network of n nodes, there can be n(n−1)/2 source-destination pairs. For each of these pairs one or more (e.g., all) the possible paths can be calculated, ordered as best to worst, and marked as active. The detour route element can be configured to use only the top few active paths. If congestion is detected on any link, all the paths using that link can be marked inactive. Congestion can be detected, for example, through a network management system (NMS) or when a node requests an alternate path indicating that its link in the current path is congested. This server can be centralized or distributed or in the node itself.

At step 130, the detour route element can reply with one or more alternate paths (e.g., the best alternate path) from storage such as an associated routing table of active alternate paths. If there is no active alternate path, the detour route element can reply with NULL. If the node receives a NULL response, the node will default back to its routing table at step 132.

At step 134, if the node receives an alternate path. The alternate path can be added to cache (e.g., associated with the node) and used to route the flow (F1). At this stage, all the traffic prior to F1 can continue to use a first path and F1 can use the alternate path. If the congestion clears in the first path while the flow F1 is active, the flow F1 will not be re-routed by default onto the first path. The cache entry can be timed out when there is no active flow, at step 136. In an aspect, if the node receives another flow (F2) while F1 is using the alternate path, the node can check if the node's link in the first path is congested. If the first path is not congested, the flow (F2) can then be routed via the first path. If the first path is congested, the node can determine whether an alternate path exists for the required next-hop.

Figure 2:
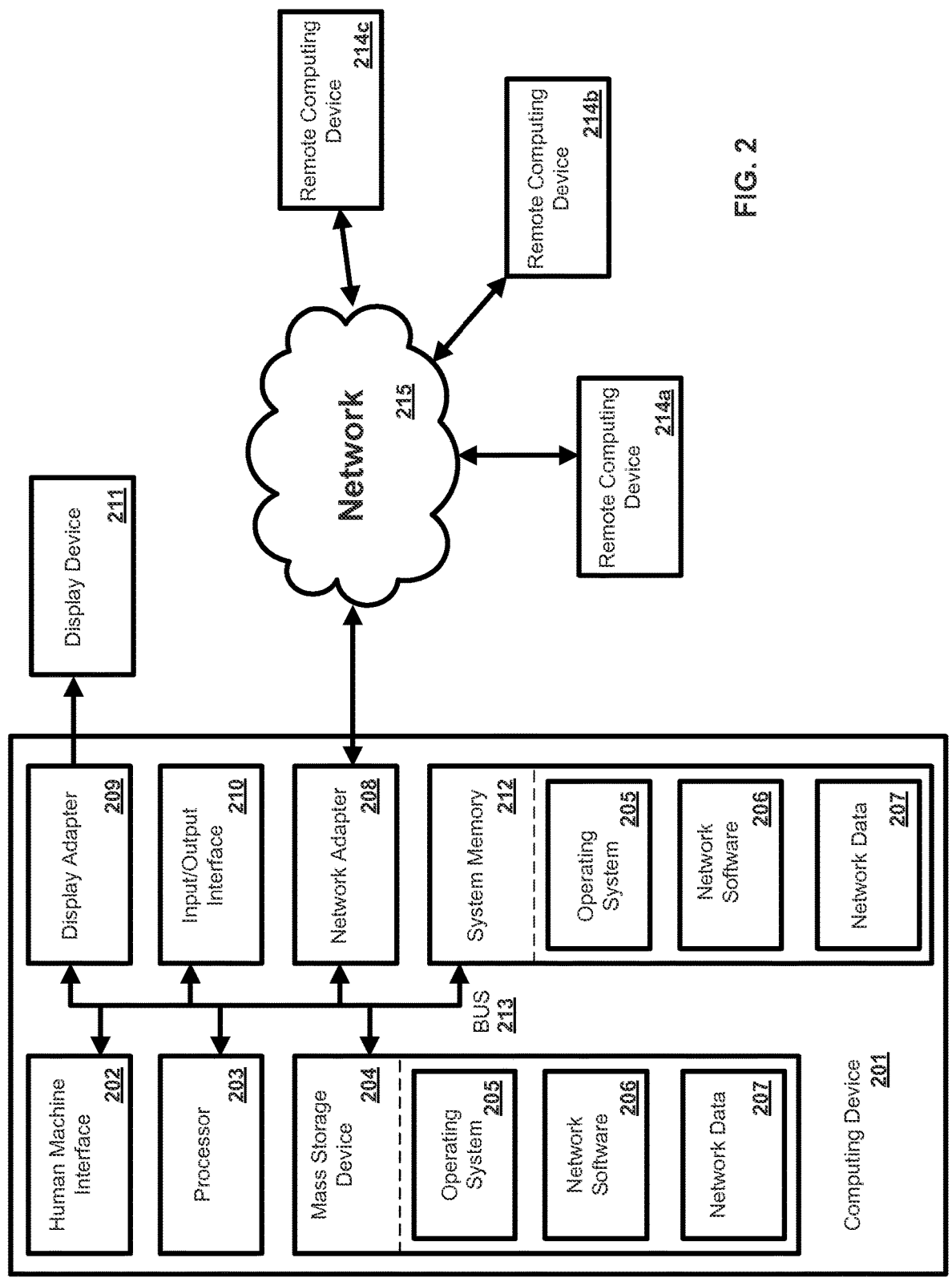
FIG. 2 is a block diagram of an exemplary computing device.

In an exemplary aspect, the methods and systems can be implemented on a computing system, such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. One skilled in the art will appreciate that this is a functional description and that the respective functions can be performed in a system by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device, mouse, microphone, joystick, scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
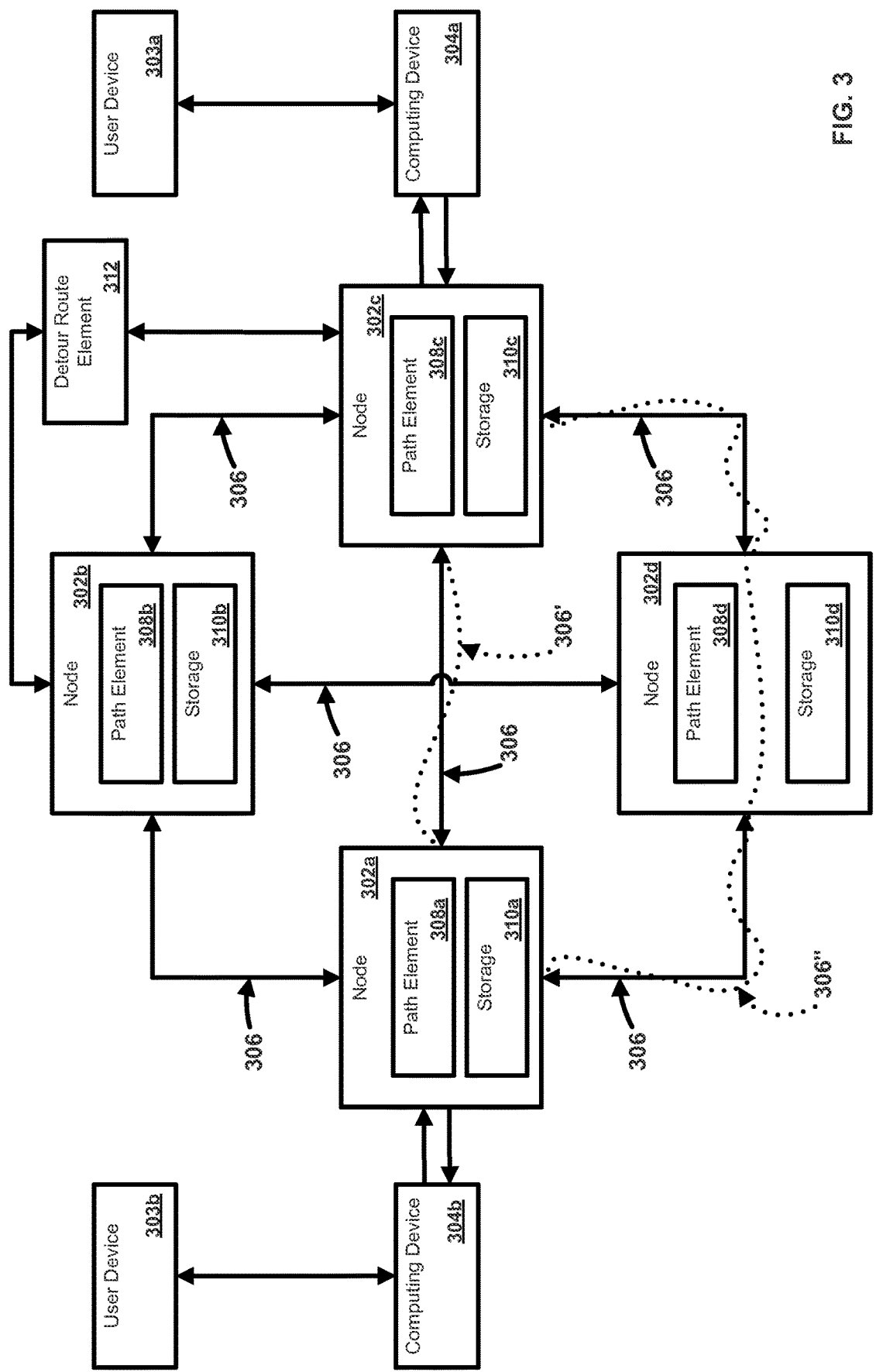
FIG. 3 is a diagram of an exemplary system and network.

FIG. 3 illustrates an exemplary system. In an aspect, a plurality of nodes 302a, 302b, 302c, 302d can be in communication with one or more user devices 303a, 303b and/or one or more computing devices 304a, 304b. One or more of the nodes 302a, 302b, 302c, 302d can be a network access point, router, switch, network interface, or other communication device. As an example, one or more user devices 303a, 303b can be an electronic device, such as a computer, a smartphone, a laptop, a tablet, a set top box, a display device, or other device capable of communicating with one or more of the nodes 302a, 302b, 302c, 302d of the network. As a further example, one or more computing devices 304a, 304b can be a server, a gateway, customer premises equipment (CPE), a network interface device (NID), an optical networking unit (ONU), a headend, a terminal server, a cable modem terminal system, or other network device. As an example, one or more of the nodes 302a, 302b, 302c, 302d can be configured to communicate with at least one of the other of the nodes 302a, 302b, 302c, 302d and/or one or more of the computing devices 304a, 304b via one or more communication paths 306. In an aspect, the one or more communication paths 306 can comprise one or more uninterrupted communication links, sequential links, pre-defined paths or links, and/or intervening nodes. Links can comprise a single point-to-point connection between two devices or access points. Paths can comprise one or more links. As an example, one or more of the communication paths 306 can comprise one or more of the nodes 302a, 302b, 302c, 302d. As a further example, one or more of the nodes 302a, 302b, 302c, 302d can be configured as a mesh network. In an aspect, one or more of the communication paths 306 can be configured to transmit one or more services.

In an aspect, one or more path elements 308a, 308b, 308c, 308d can comprise information relating to one or more of the communication paths 306. One or more path elements 308a, 308b, 308c, 308d can comprise information relating to congestion, path priority, path cost, capacity, bandwidth, signal strength, latency, error rate, path usage, and the like. As an example, the path element 308a, 308b, 308c, 308d can be or comprise the congestion element 118 (FIG. 1A).

In an aspect, one or more of the nodes 302a, 302b, 302c, 302d can be configured to determine if a link in an outgoing path 306' is congested. In an aspect, a path can be a hop-by-hop set of nodes visited in travelling from one point to another in the network. In another aspect, a hop in a path can comprise more than one link configured to pass network traffic. As an example, node-x and node-y may have 6 of 10 GE links between them, load sharing the traffic from point x to point y.

If it is determined (by one or more of the nodes 302a, 302b, 302c, 302d) that a link is not congested, the network flow can be routed based on current configuration (e.g., normal operation, default configuration, etc.). If the link is determined to be congested, it can be determined whether an alternative path 306" to the next hop is available and known. In an aspect, the node can analyze a local cache (e.g., storage 310a, 310b, 310c, 310d), such as a routing table, to determine if an alternative route 306" is available.

In an aspect, one or more of the nodes 302a, 302b, 302c, 302d can query a detour route element 312 (e.g., server) for an alternate path 306", indicating that a current path to the given next-hop in the routing table is congested. In an aspect, the detour route element 312 can be configured as an enhanced network weather map. A weather map can be an application that can generate a network topology map and can identify utilization on each link and/or path hop. The detour route element 312 can discover the network topology using techniques such as weather map or spectrum or accessing a node's routing database. As an example, the detour route element 312 can also collect link state table information from the IGP.

In an aspect, a loopback interface (e.g., a designated loopback interface such as Lo1, Lo51, etc.) can be provided on one or more of the nodes 302a, 302b, 302c, 302d for elastic routing (ER). Elastic routing can comprise leveraging additional bandwidth made available via an alternate path when a primary path is unavailable (e.g., filled to capacity, failed, etc.). Such an alternative path can comprise routing network traffic through one or more loopback interfaces designated for alternate routing procedures. A loopback interface can be or comprise a logical interface and/or a physical port on a network node. As an example, any IP packet received via the loopback interface can have a top IP header removed before the packet is further analyzed. As a further example, the loopback interface can be advertised in the IGP so that each of the one or more of the nodes 302a, 302b, 302c, 302d has knowledge of the path(s) to each other's loopback interface.

Figure 4A:
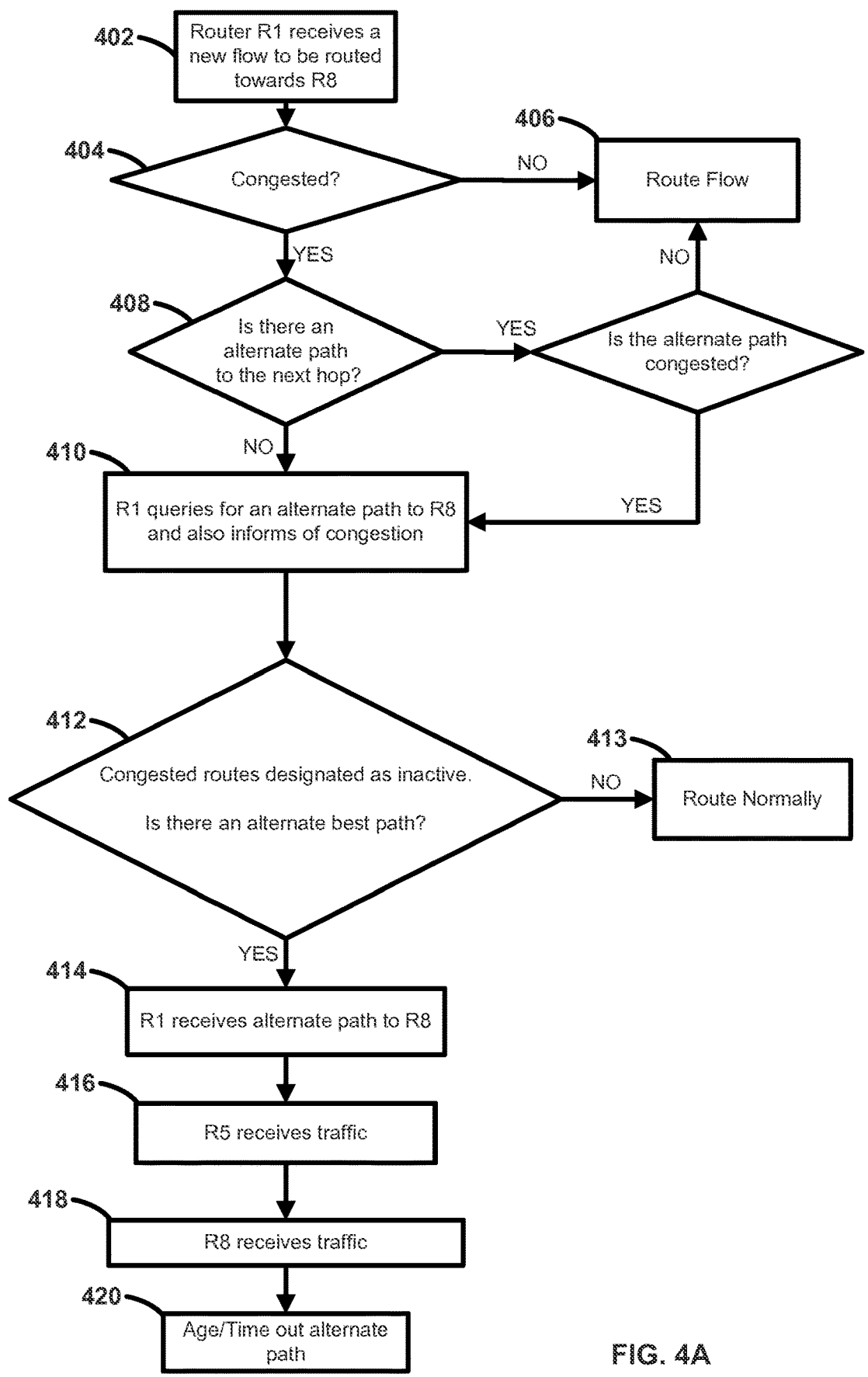
FIG. 4A is a diagram of an exemplary method.

FIGS. 4A-4B illustrate a method and system for congestion management in a network. At step 402, network traffic (e.g., flow (F1)) can be received or monitored at node R1 (e.g., node 302a (FIG. 4B), router, network device), or other location. In an aspect, the network flow can have a network destination associated therewith, such as node R8 (e.g., node 302c (FIG. 4B)), for example.

At step 404, the node R1 can determine if an interface (e.g., portion of the node, link, loopback interface (Lo1, Lo51, etc.)) in the outgoing path is congested. Nodes, such as node R1, can have one or more interfaces such as loopback interface Lo1, Lo51, etc. Such interfaces can have identifiers such a 1.1.1.1 (for Lo1) or 11.11.11.11 (for Lo51), to distinguish one interface from another. As an example, congestion (e.g., on an interface-by interface manner) can be determined based upon a congestion threshold. If it is determined that the interface is not congested, the network flow can be routed, for example, via the interface, at step 406. If the interface is determined to be congested, it can be determined whether an alternative path to the next hop is available and known, at step 408. In an aspect, the node can analyze a local cache such as a routing table to determine if information relating to an alternative route is locally available.

At step 410, the node R1 can query a detour route element (e.g., detour route element 312 (FIG. 3)) for an alternate path, indicating that its current interface to the given next-hop in the routing table is congested. In an aspect, the detour route element can determine all the possible paths for all the BGP loopback pair interfaces (e.g., Lo0, L051, etc.) and orders these paths as best to worst in its active alternate route table (e.g., no path can have a node more than once). A path for a given loopback pair can be stored using ER loopback IP hop-by-hop (e.g., a path from node R1 to node R8 via node R3 (FIG. 4B) can be stored as Path{1.1.1.1: 8.8.8.8}={11.11.11.11:33.33.33.33:88.88.88.88}, which can represent a shift from interfaces Lo1 to Lo51). In another aspect, the detour route element can track utilization on all links (e.g., using SNMP polling or through another such tool, such as SevOne). If a congested link is found, all the paths using that link can be placed in an inactive alternate route table (at step 412) until the link becomes free from congestion. A congestion threshold used on the detour route element can be less than or equal to the threshold of the nodes (e.g., an interface can be configured at 97% congestion threshold and the detour route element is configured at 95%). In a further aspect, the IP of the detour route element can be defined on each node (authentication can be used for security).

As an illustrative example, network traffic, such as video content, can be delivered from a video source in a data center peering with node R1 to viewers somewhere in the Dallas market, which is peering with R8. Since R1 learns the route to the viewers via internal BGP and R8 has "next-hop-self" configured, this route appears in R1's routing table with the next-hop of R8. During normal operation the best path is R1→R3→R8, written as Path{1.1.1.1: 8.8.8.8}={11.11.11.11:33.33.33.33:88.88.88.88}. If there is a new flow for this path and R1 finds its outgoing interface loaded beyond the congestion threshold, R1 sends a query to detour route element with the source IP of 1.1.1.1, informing detour route element that the outgoing interface is congested and requesting an alternate route to 8.8.8.8.

At step 412, the detour route element can designate any path using the reported congested interface as inactive. The detour route element can reply with the alternate best path from its active alternate path table. If there is no active alternate path available, detour route element can reply with NULL. If a NULL response is received, the node can fall back to normal routing, at step 413. As an example, the alternate path can be a set of loopback interfaces of the nodes (e.g., alternate best path=Path{1.1.1.1: 8.8.8.8}={55.55.55.55:88.88.88}). As a further example, the set of loopback interfaces can be designated for elastic routing.

If an alternate path is received, the node can store route information in cache, at step 414. As an example, when R1 receives an alternate path to R8, such as {55.55.55.55: 88.88.88}, the route information can be cached as "ER 8.8.8.8 [AD/metric] via 55.55.55.55:88.88.88, <time>, <outgoing interface>". Alternate routes can be ordered such that each successive alternate route has higher AD (Administrative Distance). Administrative distance can be analyzed to select the best path when there are two or more different routes to the same destination from two different routing protocols. Administrative distance can define the reliability of a routing protocol or route. As an example, each routing protocol is prioritized in order of most to least reliable (believable) with the help of an administrative distance value. As a further example, AD values can be assigned to one or more protocols such as illustrated in the table below:

| Route Source | Example AD Values |
| --- | --- |
| Connected interface | 0 |
| Static route | 1 |
| Enhanced Interior Gateway Routing Protocol (EIGRP) summary route | 5 |
| External Border Gateway Protocol (BGP) | 20 |
| Internal EIGRP | 90 |
| IGRP | 100 |
| OSPF | 110 |
| Intermediate System-to-Intermediate System (IS-IS) | 115 |
| Routing Information Protocol (RIP) | 120 |
| Exterior Gateway Protocol (EGP) | 140 |
| On Demand Routing (ODR) | 160 |
| External EIGRP | 170 |
| Internal BGP | 200 |
| Unknown* | 255 |

Other AD's can be associated with any route source (e.g., interface). Further, AD values can be modified.

Figure 4C:
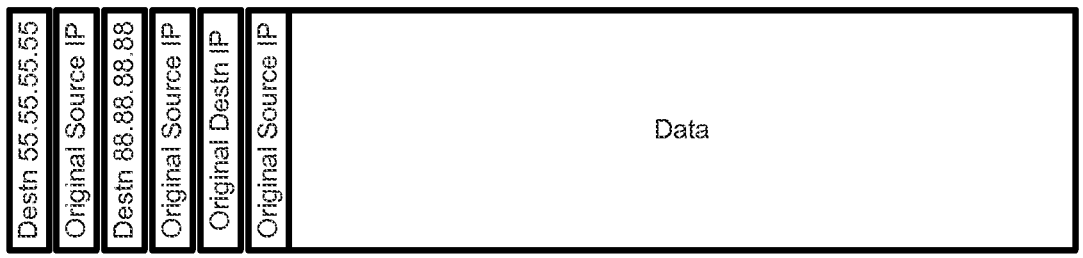
FIG. 4C is a block diagram of a data with header information.
Figure 4D:
FIG. 4D is a block diagram of a data with header information.
Figure 4E:
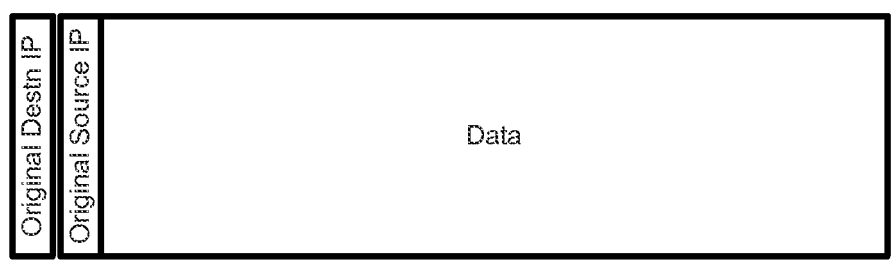
FIG. 4E is a block diagram of a data with header information.

In order to forward the traffic via an alternate path, the node can attach an additional IP header for each hop (55.55.55.55 and 88.88.88) in the alternate path starting from last hop in the alternate path and using source IP as part of the original packet, as illustrated FIG. 4C-4E.

In an aspect, any packet received, at a node, e.g., via a loopback interface, has its outer IP header removed and traffic is routed normally. As an example, when node R5 (55.55.55.55) receives the packet illustrated in FIG. 4C, since it is destined to R5's interface (e.g., Lo51), the top IP header is removed (FIG. 4D) and the packet is routed normally towards R8 (88.88.88), at 416. As a further example, when R8 (88.88.88) receives the packet on its Lo51 interface, the outer IP header is removed (FIG. 4E) and the original IP packet is exposed, at 418. In another aspect, the alternate route is timed out if it has no active flow for the configured time out value (e.g., 30 seconds), at 420. As an example, generic filtering (e.g., ACL, prefix-list) can be used to include or exclude a flow from elastic routing.

Figure 5:
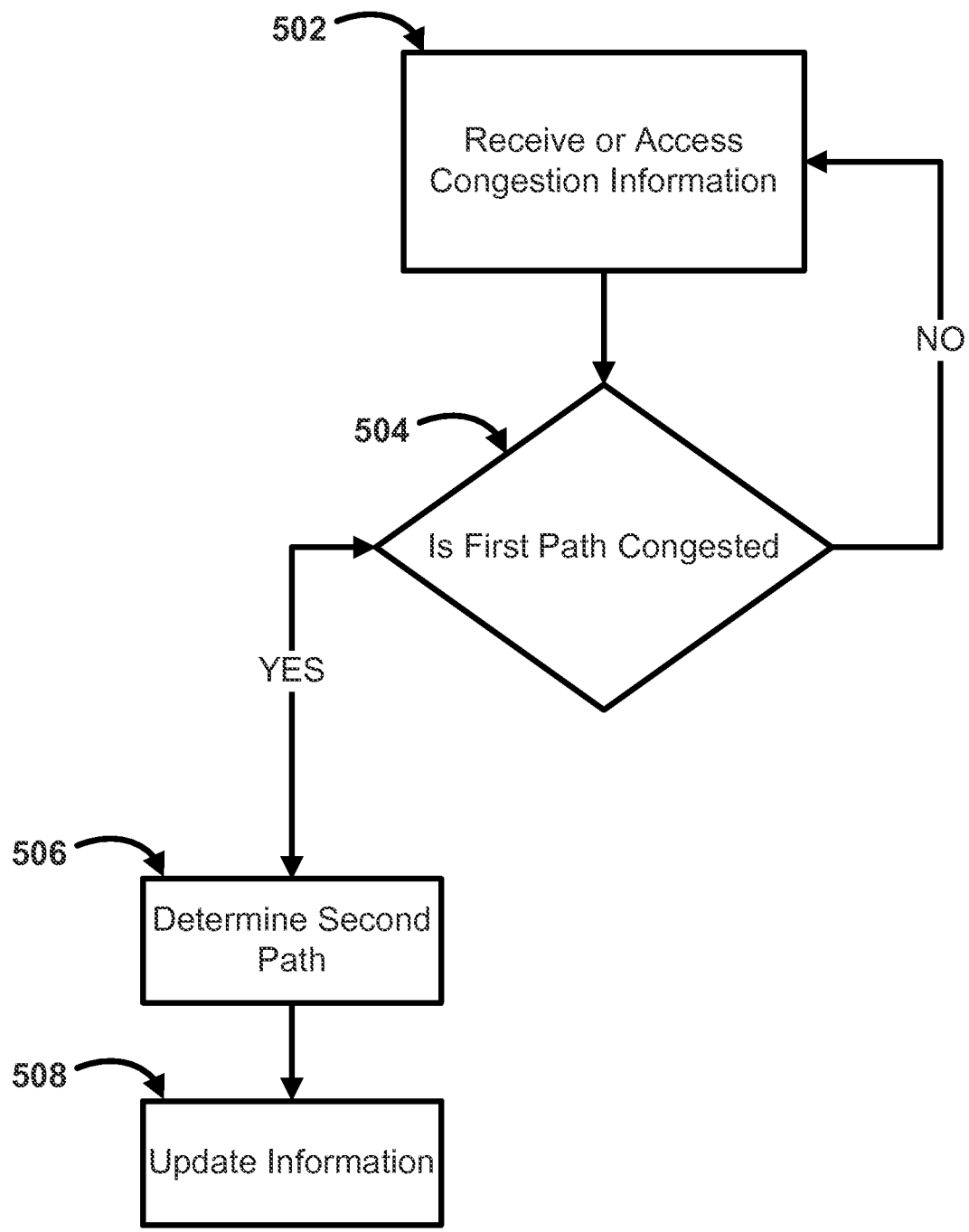
FIG. 5 is a flow chart of an exemplary method.

FIG. 5 illustrates an exemplary method for managing a network. At step 502, data can be received or accessed. In an aspect, the data can comprise information identifying a first path to a destination. The first path can comprise one or more links. As an example, the information can facilitate transmission of the data to a next-hop of the first path. In another aspect, the data can comprise a header storing the information.

At step 504, a congestion state of the first path can be determined. In an aspect, determining a congestion state of the first path can comprise comparing a parameter associated with the first path to a threshold. As an example, the threshold can comprise one or more of an absolute value and a relative value associated with the parameter. As a further example, the threshold can be a percentage of a target bandwidth.

At step 506, if the first path has a congested state, a second path to the destination can be determined. The second path can have a non-congested state. In an aspect, determining a second path can comprise comparing a parameter associated with the second path to a threshold. In another aspect, determining a second path can comprise selecting the second path from a group of prioritized alternative paths, wherein each of the prioritized alternative paths is configured to facilitate transmission of the data along a respective prioritized alternative path. In another aspect, determining a second path can comprise querying a detour element for an alternative non-congested path. In further aspect, determining a second path can comprise retrieving information relating to the second path from one or more of a node cache and/or a centralized database.

At step 508, information such as the information received at step 502 or information relating to the data received at step 502 can be updated to identify the second path to the destination, wherein the updated information facilitates transmission of the data to a next-hop of the second path.

Figure 6:
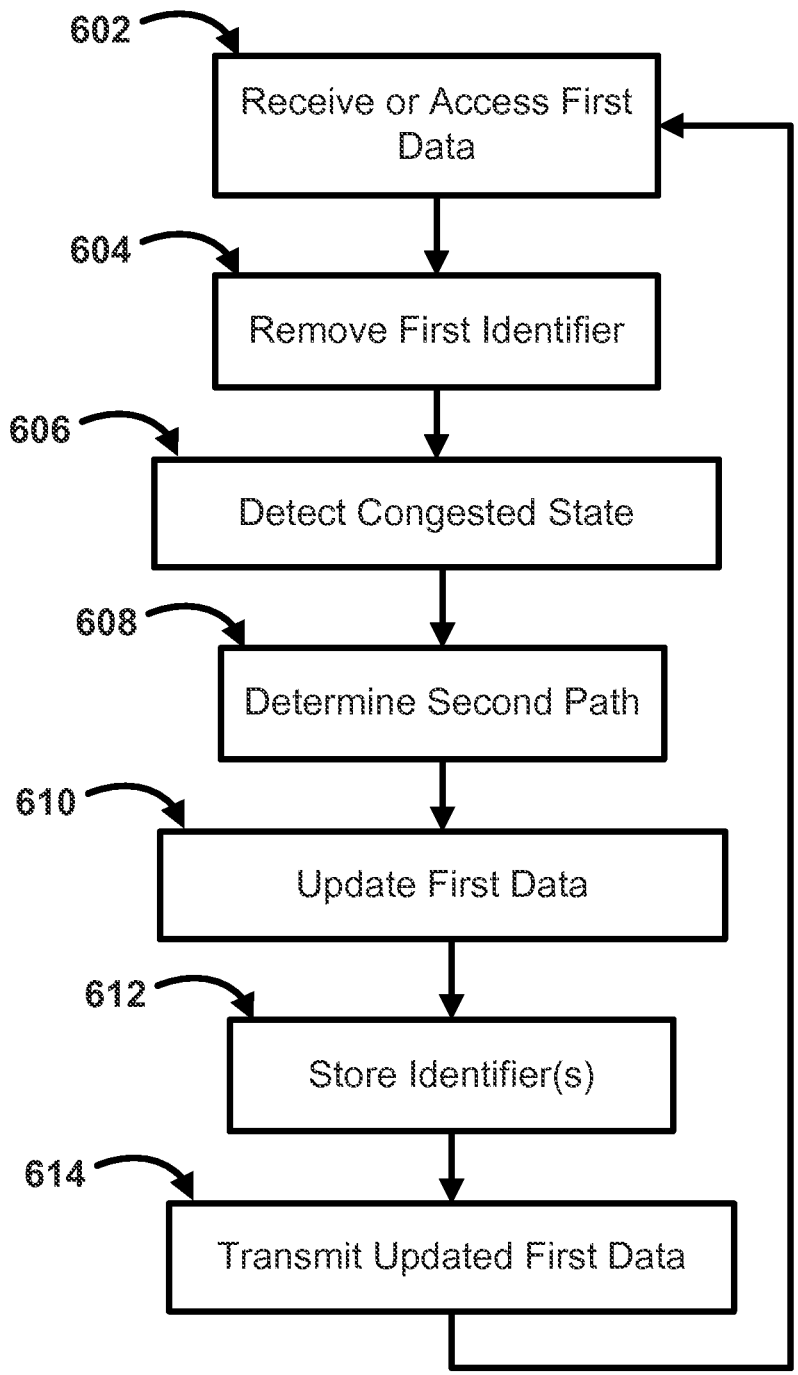
FIG. 6 is a flow chart of an exemplary method.

In an aspect, FIG. 6 illustrates an exemplary method for managing a network. In step 602, first data can be received. The first data can comprise a first identifier associated with the first node and a second identifier associated with a first path. The first node can be a network device, such as a router. The first path can comprise one or more links. In another aspect, the first data can comprise a header storing one or more of the first identifier and the second identifier.

At step 604, the first identifier can be removed from the first data. In an aspect, the first node can remove a portion of a header to expose other portions of the header, such as the second identifier. As an example, the first identifier can be relied upon to transmit data to a node associated with the first identifier. Once the data has arrived at the node associated with the first identifier, the first identifier can be removed to expose the next identifier associated with the next node in the travel path of the data.

At step 606, a congested state of the first path can be determined using the second identifier. In an aspect, detecting a congestion state of the first path can comprise comparing a parameter associated with the first path to a threshold. As an example, the parameter can be bandwidth and the threshold can be a percentage of the bandwidth.

At step 608, a second path can be determined. In an aspect the second path can have a non-congested state. In another aspect, the second path can be associated with a third identifier. In a further aspect, determining a second path can comprise selecting the second path from a group of prioritized alternative paths. As an example, each of the prioritized alternative paths can be configured to facilitate transmission of the data along the respective prioritized alternative path.

At step 610, the first data (e.g., packet header, routing information, etc.) can be updated to comprise the third identifier associated with the second path. In step 612, the third identifier can be associated (e.g., stored) with the first node. In an aspect, the third identifier can be stored in a cache associated with the first node. As such, subsequent network traffic can be routed by the first node based on the third identifier. In step 614, the updated first data can be transmitted to a second node. In an aspect, the second node can form part of the second path.

Figure 7:
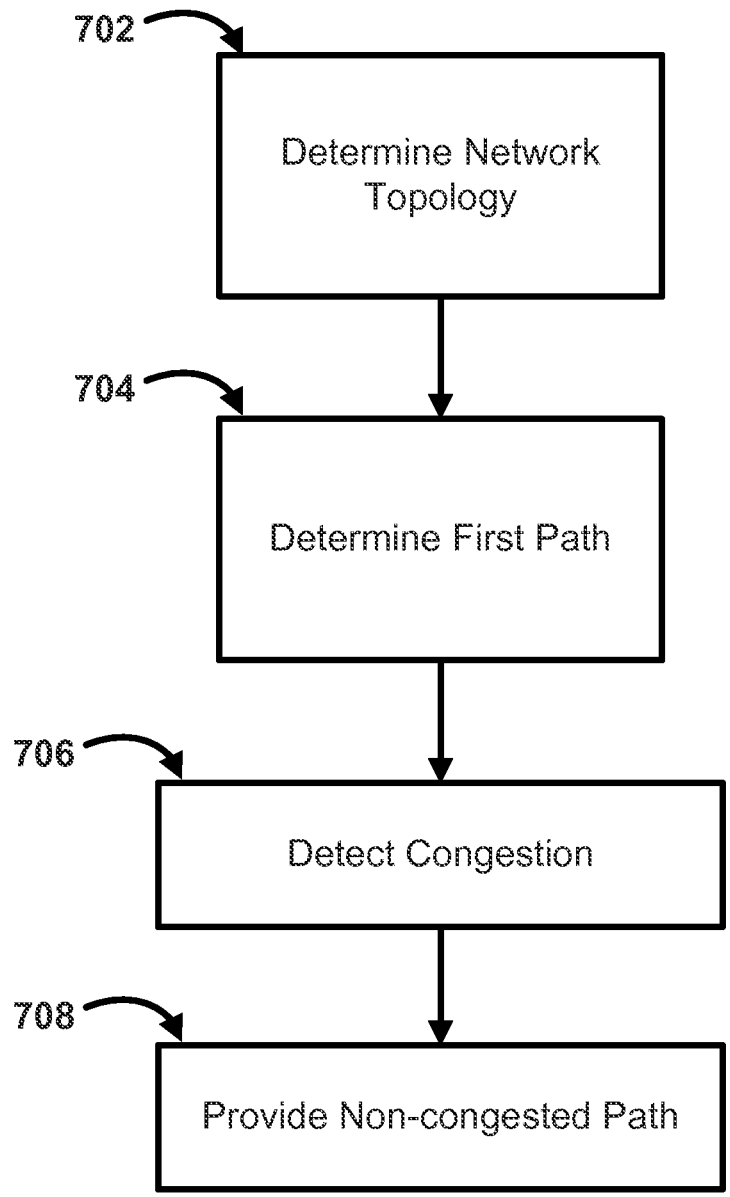
FIG. 7 is a flow chart of an exemplary method.

In an aspect, FIG. 7 illustrates an exemplary method for determining or modifying an effective bandwidth and/or data rate. In step 702, a topology of at least a portion of a network can be determined. In an aspect, a visualization such as a weather map (e.g., PHP Weather map) can be generated for at least a portion of the network. In another aspect, the weather map can determine utilization and other parameters such as jitter and latency of one or more of the nodes and links. As an example, the network can be a packet network.

At step 704, a first path of a node pair of the network can be determined based on the determined topology. At step 706, a congested state can be determined for one or more links of the first path. In an aspect, detecting a congestion state can comprise monitoring utilization of the link.

At step 708, a second path can be provided as an alternate for the first path. In an aspect, the second path can circumvent the link with the detected congested state. In another aspect, providing a second path can comprise transmitting an identifier associated with the second path. In a further aspect, providing a second path can be executed in response to receiving a query for an alternate path for the first path.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a first network node, first data and a first header associated with the first data, wherein the first data is associated with a first network flow and the first header comprises a first identifier that identifies the first network node and a second identifier that identifies a second network node, wherein a first path to a destination comprises the first network node and the second network node;

determining, by the first network node, based on available bandwidth via the first path, a second path to the destination, wherein the second path comprises the first network node and a third network node, wherein the third network node is identified by a third identifier;

based on the available bandwidth via the first path, sending, based on the second identifier, the first data and the first header comprising the second identifier to the second network node via the first path;

replacing, by the first network node, based on second data associated with a second network flow and a second header comprising the first identifier and the second identifier and based on available bandwidth via the second path being greater than the available bandwidth via the first path, the second identifier in the second header with the third identifier; and based on replacing the second identifier in the second header with the third identifier, sending the second data and the second header comprising the third identifier to the third network node via the second path.

2. The method of claim 1, wherein the second path is deactivated after a period of time.

3. The method of claim 1, wherein one or more of the first path or the second path comprises one or more links, wherein the second path comprises a plurality of nodes.

4. The method of claim 1, wherein the available bandwidth via the first path is indicative of first congestion satisfying a first threshold, and wherein the available bandwidth via the second path is indicative of second congestion not satisfying one or more of the first threshold or a second threshold.

5. The method of claim 4, wherein the first threshold comprises one or more of an absolute value or a relative value associated with the available bandwidth via the first path.

6. The method of claim 1, further comprising:
receiving the second data and the second header associated with the second data, wherein the second data is associated with the second network flow and the second header comprises the first identifier and the second identifier; and removing the first identifier from the second header.

7. The method of claim 1, wherein determining the second path comprises selecting the second path from a group of prioritized alternative paths, and wherein each prioritized alternative path of the group of prioritized alternative paths is configured to facilitate transmission of data along the prioritized alternative path.

8. The method of claim 1, wherein determining the second path comprises querying for an alternative path.

9. The method of claim 1, wherein determining the second path comprises retrieving information relating to the second path from one or more of a node cache or a centralized database.

10. A method comprising:
receiving, by a first node, first data of a first network flow comprising a first identifier that identifies the first node and a second identifier that identifies a second node, wherein a first path comprises the first node and the second node;

determining, by the first node, based on available bandwidth via the first path, a second path, wherein the second path comprises the first node and a third node, wherein the third node is identified by a third identifier;

based on the available bandwidth via the first path, sending, based on the second identifier, the first data to the second node via the first path;

replacing, by the first node, based on second data comprising the first identifier and the second identifier and based on available bandwidth via the second path being greater than the available bandwidth via the first path, the second identifier in the second data with the third identifier; and based on replacing the second identifier with the third identifier, sending the second data comprising the third identifier to the third node via the second path.

11. The method of claim 10, wherein the second data comprises a header storing the first identifier and the second identifier.

12. The method of claim 10, wherein one or more of the first path or the second path comprises one or more links, and wherein the second path is deactivated after a period of time.

13. The method of claim 10, wherein the available bandwidth via the first path is indicative of first congestion satisfying a first threshold, and wherein the available bandwidth via the second path is indicative of second congestion not satisfying the first threshold.

14. The method of claim 10, wherein determining the second path comprises selecting the second path from a group of prioritized alternative paths, and wherein each prioritized alternative path of the group of prioritized alternative paths is configured to facilitate transmission of data along the prioritized alternative path.

15. The method of claim 10, further comprising:

receiving, by the first node, the second data associated with a second network flow comprising the first identifier and the second identifier; and removing, based on receiving the second data, the first identifier from the second data.

16. A method comprising:

receiving, by a first device, a first identifier that identifies the first device and a second identifier that identifies second device that are associated with a first path to a destination, wherein the first identifier and the second identifier facilitate transmission of first data associated with a first network flow to a next-hop, wherein the next-hop is identified by the second identifier;

determining, based on available bandwidth via the first path, a second path to the destination, wherein the second path is associated with a third identifier that identifies third device;

based on the available bandwidth via the first path, sending, based on the second identifier, the first data of to the next-hop via the first path;

replacing, by the first device, based on second data associated with a second network flow and comprising the first identifier and the second identifier and based on available bandwidth via the second path being greater than the available bandwidth via the first path, the second identifier in the second data with the third identifier; and based on replacing the second identifier with the third identifier, sending the second data comprising the third identifier via the second path.

17. The method of claim 16, wherein the first identifier comprises a header of the first data that identifies the first path, wherein the next-hop of the second path comprises a next node, and wherein the second path is deactivated after a period of time.

18. The method of claim 16, wherein determining the second path comprises selecting the second path from a group of prioritized alternative paths, and wherein each prioritized alternative path of the group of prioritized alternative paths is configured to facilitate transmission of data along the prioritized alternative path.

19. The method of claim 16, wherein determining the second path comprises querying a detour element for an alternative non-congested path.

20. The method of claim 16, wherein the second path comprises a plurality of nodes.

21. The method of claim 16, further comprising:

receiving, by the first device, the second data associated with the second network flow that identifies the first path to the destination based on the first identifier and the second identifier; and removing, based on receiving the second data associated with the second network flow, the first identifier from the second path.

* * * * *